Patented July 14, 1942

2,289,595

UNITED STATES PATENT OFFICE 2,289,595

SELENIUM COMPOUNDS

Winfield Scott, Akron, Ohio, assignor to Wingfoot Corporation, Wilmington, Del., a corporation of Delaware No Drawing. Application May 21, 1938, Serial No. 209,363

14 Claims. (Cl. 260—293)

This invention relates to a new class of compounds, members of which are useful in the vulcanization of rubber. More particularly, it relates to new compounds containing selenium.

Certain types of compounds have heretofore been described which contain a thiocarbamyl nucleus, the same having been found to be valuable as accelerators of the vulcanization of rubber. It has now been discovered that selenone compounds of the same type may be prepared and some of these are even better accelerators of rubber vulcanization than are the corresponding thione compounds.

The new class of the compounds is quite comprehensive and may be generally denoted by the formula

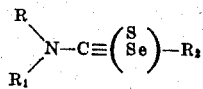

or, probably,

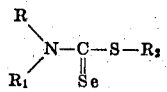

in which R and $R_1$ represent hydrogen or any organic radical, such as alkyl groups, aryl groups, aralkyl groups, or these groups substituted in turn by many other radicals. Of course, R may be hydrogen and $R_1$ may be an organic radical, or, R and $R_1$ together may form with the nitrogen atom a heterocyclic ring, such as that of piperidine. $R_2$ may be any organic radical, including heterocyclic rings involving nitrogen or other atoms, ammonium and substituted ammonium, trivalent nitrogen substituents as in the sulphene amides, or a duplication of the remainder of the formula given above, as in the selenuram disulphides, or a thio seleno carbamate radical as in the selenuram monosulphides, or a metal.

It will be apparent from the foregoing that the characteristic part of applicant's compounds is the thio selenocarbamate radical,

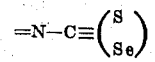

and that the nature of the substituents included under R, $R_1$ and $R_2$ is not characteristic. Therefore, the invention includes all compounds containing the characteristic selenothiocarbamate nucleus regardless of the substituents associated therewith.

These compounds may be prepared very readily by bringing together, in an appropriate solvent, and usually at room temperature or thereabouts, an amine and carbon sulfoselenide, CSSe. The carbamic acid compound thus formed is believed to be of the selenone thiol type in which the selenium atom is doubly bonded to carbon but the molecular configuration has not been established with certainty.

The invention includes various sub-types of compounds containing the characteristic selenothiocarbamyl or thioselenocarbamyl nucleus, such as the esters and salts of selenothiocarbamic acids, e. g., amine salts and metal salts, the selenuram disulfides and the selenuram mono sulfides. These various sub-types are illustrated in the following examples, although it is to be understood that the invention is not limited to the types described or to the procedure illustrated.

Thus, the esters and salts of selenothiocarbamic acids come within the sub-type formula

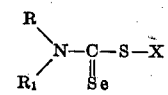

in which R and $R_1$ are hydrogen or any organic radical, or together make up a ring with the nitrogen, all as defined in the comprehensive formula above, and X indicates any salt or ester forming radical. This sub-type is illustrated as follows:

Example 1

Piperidinium penta methylene selenothiocarbamate is prepared by reacting piperidine with carbon sulfoselenide in a suitable solvent, such as petroleum ether or ether. As observed with piperidine and carbon bisulfide, the reaction is very rapid and practically quantitative, the reactants usually being provided in equivalent amounts. Piperidinium penta methylene selenothiocarbamate is obtained as yellowish crystals melting at 162–163° C. It is soluble in alcohol, slightly soluble in ether and insoluble in petroleum ether. The reaction is believed to proceed as follows:

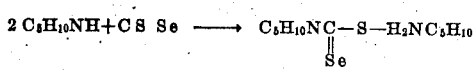

Example 2

Diethyl ammonium diethyl selenothiocarbamate is readily prepared from diethyl amine and carbon sulfoselenide in ether solution. A cold ether solution of diethylamine is added to a mixture of carbon sulfoselenide and ether, the ingredients being present in approximately equivalent quantities. The selenothiocarbamate precipitates at once in quantitative yield. It is obtained as yellowish-orange needles melting at 83° C. with decompositon. The material is soluble in water and in alcohol but is insoluble in petroleum ether. The compound is believed to have the formula:

$$(C_2H_5)_2N-CSeS-NH_2(C_2H_5)_2$$

Example 3

Dimethyl ammonium dimethyl selenothiocarbamate is prepared by passing gaseous dimethylamine into an ethereal solution of carbon sulfoselenide. The product is obtained as yellow crystals melting with decomposition at 114–116° C. It has the odor characteristic of the corresponding material made from dimethyl amine and carbon bisulfide.

Example 4

Illustrative of certain other salts which may be prepared from organic bases other than the amines described above are the guanidine salts of selenothiocarbamic acid. For instance, the diphenyl guanidine salt of penta methylene selenothiocarbamic acid may be prepared by allowing aqueous solutions of a soluble salt, e. g., Na, K, of penta methylene selenothiocarbamic acid and diphenylguanidine hydrochloride to react at room temperature. The insoluble diphenylguanidine salt is precipitated in quantitative yield. It is a white crystalline powder melting at 163–164° C. Analysis for nitrogen showed N. 12.8%, while the calculated nitrogen content is 13.4%. The equation for the preparation is thought to be the following:

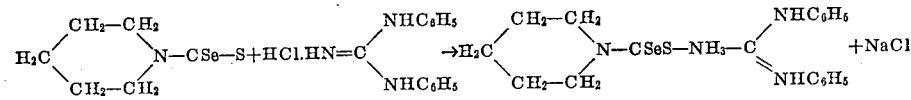

Other compounds similar to those described in Examples 1–4 may be prepared in the same manner there illustrated, some of these being dibutyl ammonium dibutyl selenothiocarbamate, dibenzyl ammonium dibenzyl selenodithiocarbamate, diamyl ammonium diamyl selenothiocarbamate, and the selenothiocarbamates derived from methyl cyclohexylamine, methyl aniline, ditetrahydro furfuryl amine, ethyl cyclohexylamine, methyl naphthylamine, the dinitrophenyl esters of diethyl and various other selenothiocarbamic acids, the aralkyl esters, such as the benzyl ester of dimethyl selenothiocarbamate, and the like.

Other guanidine salts included within the scope of the invention are the ditolyl guanidine salt of dimethyl selenothiocarbamic acid, the dixylyl guanidine salt of diethyl selenothiocarbamic acid and the corresponding salts which may be prepared from any of the substituted guanidines herein mentioned and others, such as those of phenyl ortho tolyl guanidine and methyl phenyl guanidine, with any of the substituted selenothiocarbamic acids in the form of their soluble salts, described herein. Other salts are those of the biguanides, such as the o-tolyl biguanide salts of the various selenothiocarbamic acids. Of course, it will be apparent that the alkyl and aryl radicals of these amines or guanidines may be further substituted, the selenothiocarbamates formed therefrom falling within the scope of the invention. Of these, those in which R and R₁ in the above formula both represent organic radicals are preferred as vulcanization accelerators and those in which R and R₁ are both hydrogen are believed to have little value as such.

Oxidation of the amine salts or metallic salts of seleno thiocarbamic acids yields disulfides analogous to the disulfides formed from the dithiocarbamic acids. The name selenuram disulfides is applied to these oxidation products of the selenothiocarbamates since it is believed that they are disulfides rather than diselenides and to be represented by the general formula:

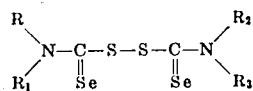

where R, R₁, R₂ and R₃ are hydrogen, or any organic radical, R and R₁ being defined hereinabove in connection with the comprehensive formula and R₂ and R₃ being here similarly defined.

Example 5

The usual oxidizing agents employed in the preparation of thiuram disulfides may be used in making the selenuram disulfides, for example, iodine, hydrogen peroxide, alkali metal or ammonium persulfates and the like. Thus, dipentamethylene selenuram disulfide is prepared as follows: An alcoholic solution of piperidinium penta methylene selenothiocarbamate is treated with increments of an alcoholic solution of iodine until no more of the disulfide is formed, or until the alcoholic mother liquor shows the presence of free iodine. The material is obtained as orange crystals melting at 134–135° C. Analysis for nitrogen showed, N. 6.58 and 6.55%, while the calculated value for pentamethylene selenuram disulfide is 6.76%. The reaction is believed to proceed as follows:

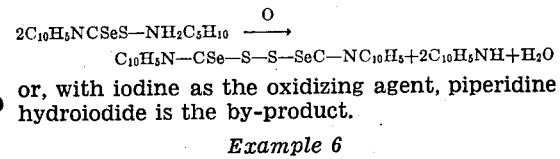

or, with iodine as the oxidizing agent, piperidine hydroiodide is the by-product.

Example 6

Similarly, tetra methyl selenuram disulfide is prepared from dimethyl ammonium dimethyl selenothiocarbamate in alcoholic solution by the action of iodine. It forms orange colored crystals melting at 154° C. The material is somewhat soluble in ether and easily soluble in hot alcohol. It is believed to have the formula:

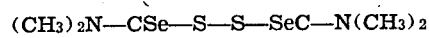

Other selenuram disulfides which may be prepared in the same manner as that illustrated in Examples 5 and 6 are tetraethyl selenuram disulfide, diphenyl diethyl selenuram disulfide, ethyl phenyl dimethyl selenuram disulfide, tetrapropyl selenuram disulfide, methyl phenyl ethyl selenuram disulfide, and the selenuram disulfides derivable by the steps illustrated in Examples 1–6 from any of various amines, such as dibutyl amine, diamyl amine, methyl aniline, ethyl aniline, dibenzyl amine, methyl or ethyl cyclohexylamine, p-ethoxy cyclohexylamine, etc. Here, again, only those compounds in which both nitrogen atoms in the above formula are at least mono substituted and preferably disubstituted are useful as accelerators of vulcanization.

In turn, these selenuram disulfides are readily converted into the mono sulfides by the action of metal cyanides or of a cyanogen halide, preferably cyanogen chloride. Analysis shows that sulfur, and not selenium, is removed from the disulfides by the action of cyanides. This indicates that the sulfur assumes the thiol position in the carbamates and that these form selenuram disulfides, as assumed in the formula ascribed above. In other words, the selenium atom assumes the ketonic position with respect to the carbon atom and the sulfur assumes the enol position with respect to the carbon atom. To this sub-group may be ascribed the general formula

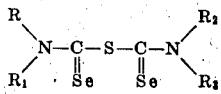

where R, $R_1$, $R_2$ and $R_3$ are defined as in the formula for the disulphides given above.

Example 7

The mono sulfide may therefore be formed as follows. An alcoholic solution of dipentamethylene selenuram disulfide is warmed with the calculated amount of potassium cyanide for 30 minutes. The solution is then cooled and water is added to turbidity. The mono sulfide is obtained as bright orange-yellow crystals melting at 116–117° C. It is quite soluble in alcohol and sparingly soluble in hot water. The reaction is believed to proceed in accordance with the equation:

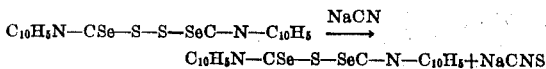

Other selenuram mono sulfides may be similarly prepared, among them tetramethyl selenuram mono sulfide, tetraethyl selenuram mono sulfide, tetrapropyl selenuram mono sulfide, tetraamyl selenuram mono sulfide, diphenyl diethyl selenuram mono sulfide, ethyl phenyl ethyl selenuram mono sulfide, ethyl phenyl dimethyl selenuram mono sulfide, and the selenuram mono sulfides which may be prepared by the sequence of steps illustrated in Examples 1–6 from such amines as dibutyl amine, di isopropyl amine, methyl aniline, ethyl aniline, dibenzyl amine, piperidine, etc. Those in which both nitrogen atoms are at least mono substituted and preferably di substituted are useful as accelerators of the vulcanization of rubber.

The metal salts of the selenothiocarbamates may be generally indicated by the sub-type formula

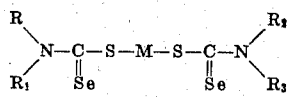

where R, $R_1$, $R_2$ and $R_3$ are as defined in connection with the disulphides and mono-sulphides above. Their preparation is illustrated in the following example.

Example 8

The preparation of the metallic salts of the selenothiocarbamates is readily brought about by reacting a salt of the selected metal with an amine and carbon sulfoselenide. Thus, two molecular proportions of piperidine are added to an aqueous solution of zinc chloride and a 5% excess of carbon sulfoselenide is then added with stirring. After 15 minutes the solid zinc salt is filtered off and washed to obtain a fresh colored powder which decomposes at 160° C. It is insoluble in water, in alcohol and in ether. Its formula is believed to be

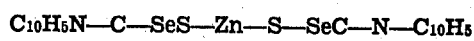

Other metal salts of any of the selenothiocarbamates may be prepared in a similar manner, such as those of lead, mercury, zinc, cadmium, copper, iron, tin, barium, calcium, magnesium, sodium, potassium, etc. Some of these are zinc dimethyl selenothiocarbamate, lead diethyl, selenothiocarbamate, iron diethyl selenothiocarbamate, zinc ethyl phenyl selenothiocarbamate, lead dibutyl selenothiocarbamate, zinc di isoamyl selenothiocarbamate and the like. With the exception of the iron and copper salts, the above-mentioned metal salts may be used in the vulcanization of rubber provided both of the nitrogen atoms are at least mono- and preferably disubstituted.

Compounds selected from those indicated herein to be useful as accelerators have been tested in rubber to determine their efficacy in the vulcanization of rubber, any of the standard rubber formulae being suitable for this test but a test stock of the following composition being selected:

Smoked sheet _____ 100.0
Zinc oxide _____ 5.0
Sulfur _____ 3.0
Accelerator _____ As indicated The test samples incorporating the accelerator to be tested were cured and the physical properties of the samples determined. The data obtained was tabulated and the results obtained are shown in Table I, the figures being those for tensile strength, elongation at break and modulus at 500% and 700% elongation. The values are given in kgs./cm.²

The compounds tested were

1. Piperidinium pentamethylene selenothiocarbamate;
2. Piperidinium pentamethylene dithiocarbamate;

a comparison thus being made between the selenothio compound and the dithio compound. In the first column the numbers refer to these two compounds.

Table I

| Product | Amount | Cure mins. at °F. | Tens. | Elong. | 500% | 700% |
|---|---|---|---|---|---|---|
|  |  |  | Kgs./cm.² | Percent |  |  |
| 1 | .20 | 10 at 260° | Uncured |  |  |  |
| 2 | .20 |  |  |  |  |  |
| 1 | .20 | 20 at 260° | 107 | 900 | 13 | 35 |
| 2 | .20 |  | 90 | 890 | 12 | 30 |
| 1 | .20 | 30 at 260° | 138 | 810 | 20 | 73 |
| 2 | .20 |  | 105 | 830 | 16 | 57 |
| 1 | .20 | 40 at 260° | 162 | 760 | 27 | 111 |
| 2 | .20 |  | 120 | 780 | 20 | 73 |
| 1 | .20 | 60 at 260° | 194 | 730 | 37 | 165 |
| 2 | .20 |  | 156 | 740 | 28 | 120 |

This data shows that, with the selenium compound, the same modulus is attained in 30 minutes cure as is reached with the sulfur compound only after 40 minutes cure.

In Table II a comparison is made of two disulfides, one being the selenium compound and the other the sulfur compound. In this table, the compounds are referred to in the first column by number as follows:

1. Dipentamethylene selenuram disulfide.
2. Dipentamethylene thiuram disulfide.
3. Tetramethyl selenuram disulfide.
4. Tetramethyl thiuram disulfide.

*Table II*

| Product | Amount | Cure mins. at °F. | Tens. | Elong. | 500% | 700% |
|---|---|---|---|---|---|---|
|  |  |  | Kgs./cm.² | Percent |  |  |
| 1 | 3.0 |  |  |  |  |  |
| 2 | 3.0 |  |  |  |  |  |
| 3 | .20 | 20 at 250° | 113 | 830 | 18 | 55 |
| 4 | .20 | 20 at 250° | Soft |  |  |  |
| 1 | 3.0 | 30 at 260° | 100 | 760 | 19 | 66 |
| 2 | 3.0 | 30 at 260° | 54 | 750 | 14 | 40 |
| 3 | .20 | 30 at 240° | 180 | 725 | 37 | 152 |
| 4 | .20 | 30 at 240° | 162 | 760 | 29 | 111 |
| 1 | 3.0 | 40 at 260° | 96 | 790 | 17 | 55 |
| 2 | 3.0 | 40 at 260° | 81 | 730 | 19 | 66 |
| 3 | .20 | 40 at 240° | 198 | 715 | 46 | 186 |
| 4 | .20 | 40 at 240° | 187 | 710 | 44 | 177 |
| 1 | 3.0 | 60 at 260° | 94 | 810 | 15 | 49 |
| 2 | 3.0 | 60 at 260° | 108 | 740 | 23 | 82 |
| 3 | .20 | 60 at 240° | 190 | 680 | 53 |  |
| 4 | .20 | 60 at 240° | 203 | 690 | 55 |  |
| 1 | 3.0 | 80 at 260° |  |  |  |  |
| 2 | 3.0 | 80 at 260° |  |  |  |  |
| 3 | .20 | 80 at 240° | 208 | 690 | 55 |  |
| 4 | .20 | 80 at 240° | 215 | 700 | 54 | 215 |

In Table II products 1 (dipentamethylene selenuram disulfide) and 2 (dipentamethylene thiuram disulfide) were used without additional sulfur, that indicated in the test stock formula being omitted. In other words, these stocks contain only rubber, zinc oxide and the accelerator. The greater activity of the selenium compound is apparent since it reached its optimum cure in 30 minutes or thereabouts, while the optimum cure for the sulfur compound is about 40 minutes.

With No. 3 (tetramethyl selenuram disulfide) and No. 4 (tetramethyl thiuram disulfide), only .20 part of accelerator was used with the regular amount (3.0 parts) of sulfur as indicated in the formula. Here, again, the selenuram compound is more active than the thiuram compound.

The effectiveness of the mono sulfides was also compared, the data obtained being given below in Table III. In this test, dipentamethylene selenuram mono sulfide (product No. 1) was compared with dipentamethylene thiuram mono sulfide (product No. 2). The same stock formula was employed.

| Product | Amount | Cure mins at °F. | Tensile | Elong. | 500% | 700% |
|---|---|---|---|---|---|---|
|  |  |  | Kgs./cm². | Per cent |  |  |
| 1 | .50 | 10/260° | Both undercured |  |  |  |
| 2 | .50 | 10/260° |  |  |  |  |
| 1 | .50 | 15/260° | 164 | 710 | 39 | 158 |
| 2 | .50 | 15/260° | Undercured |  |  |  |
| 1 | .50 | 20/260° | 210 | 680 | 60 |  |
| 2 | .50 | 20/260° | Undercured |  |  |  |
| 1 | .50 | 30/260° | 198 | 640 | 75 |  |
| 2 | .50 | 30/260° | 214 | 650 | 73 |  |

As before, the selenium compound was more active as indicated by the fact that a cure was obtained in a shorter time than with the thiuram compound. Other compounds containing the selenothiocarbamyl nucleus have been similarly tested and have been found to possess desirable accelerating properties.

The compounds herein described are new in themselves, not having been previously prepared as far as known. They may be employed to cure rubber either by themselves or in conjunction with other accelerators, such as diphenylguanidine, diortho tolyl guanidine, diphenylguanidine oxalate, diphenylguanidine succinate, cyclohexyl ammonium fumarate and the like. They may also have other uses than as accelerators of rubber vulcanization and, therefore, it is not intended to limit the invention to such use. Other methods of preparing the compounds may be employed than those described and the invention includes such compounds by whatever method prepared, as well as corresponding compounds falling within the broad class defined, whether or not they have been specifically mentioned herein.

It is intended, then, that the patent shall cover, by suitable expression in the appended claims, all features of patentable novelty residing in the invention.

What I claim is:
1. The salts of selenothiocarbamic acids.
2. Amine salts of selenothiocarbamic acids.
3. Metal salts of selenothiocarbamic acids.
4. Selenuram sulphides.
5. Selenuram disulphides.
6. A method of preparing compounds containing the grouping

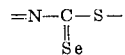

which comprises bringing together in solution an amine and carbon sulphoselenide.

7. Piperidinium pentamethylene selenothiocarbamate.
8. Dipentamethylene selenuram disulphide.
9. Zinc pentamethylene selenothiocarbamate.
10. Compounds having the general formula

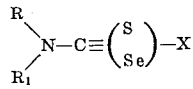

where R and R₁ are selected from the group consisting of hydrogen and organic radicals, at least one organic radical being present and, both together with the nitrogen, heterocyclic rings, X is a monovalent radical other than hydrogen, and the sulphur and selenium atoms are positioned in an open chain.

11. Compounds having the general formula

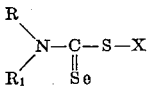

where R and R₁ are selected from the group consisting of hydrogen and organic radicals, at least one organic radical being present and, both together with the nitrogen, heterocyclic rings, and X is a monovalent radical other than hydrogen.

12. The selenothiocarbamates containing no acid hydrogen in the selenothiocarbamate radical.
13. The group consisting of salts and esters of selenothiocarbamic acids.
14. The selenocarbamyl compounds from the group consisting of selenuram sulphides, and salts and esters of selenothiocarbamic acids.

WINFIELD SCOTT.